US011722210B2

(12) United States Patent
Zhao et al.

(10) Patent No.: US 11,722,210 B2
(45) Date of Patent: Aug. 8, 2023

(54) UNMANNED AERIAL SYSTEM COMMUNICATION

(71) Applicant: TENCENT AMERICA LLC, Palo Alto, CA (US)

(72) Inventors: Shuai Zhao, Pleasanton, CA (US); Stephan Wenger, Hillsborough, CA (US); Shan Liu, San Jose, CA (US)

(73) Assignee: TENCENT AMERICA LLC, Palo Alto, CA (US)

( * ) Notice: Subject to any disclaimer, the term of this patent is extended or adjusted under 35 U.S.C. 154(b) by 46 days.

(21) Appl. No.: 17/477,979

(22) Filed: Sep. 17, 2021

(65) Prior Publication Data
US 2022/0224401 A1    Jul. 14, 2022

Related U.S. Application Data

(60) Provisional application No. 63/136,330, filed on Jan. 12, 2021.

(51) Int. Cl.
| | |
|---|---|
| *H04B 7/185* | (2006.01) |
| *G08G 5/00* | (2006.01) |
| *G01C 21/20* | (2006.01) |
| *H04W 76/19* | (2018.01) |

(52) U.S. Cl.
CPC ......... *H04B 7/18506* (2013.01); *G01C 21/20* (2013.01); *G08G 5/0069* (2013.01); *H04W 76/19* (2018.02)

(58) Field of Classification Search
CPC .. H04B 7/18506; G01C 21/20; G08G 5/0069; G08G 5/0013; G08G 5/0052; G08G 5/003; H04W 76/19; H04W 4/029; H04W 64/00
See application file for complete search history.

(56) References Cited

U.S. PATENT DOCUMENTS

| 2008/0254787 A1 | 10/2008 | Tsao et al. |
| 2018/0375568 A1 | 12/2018 | De Rosa et al. |
| 2019/0144111 A1 | 5/2019 | Apostolopoulos |

(Continued)

FOREIGN PATENT DOCUMENTS

| CN | 109075855 A | 12/2018 |
| WO | 2020/033905 A1 | 2/2020 |
| WO | 2022/246429 A1 | 11/2022 |

OTHER PUBLICATIONS

International Search Report dated Jan. 11, 2022 in Application No. PCT/US 21/53949.

(Continued)

*Primary Examiner* — Dinh Nguyen
(74) *Attorney, Agent, or Firm* — Sughrue Mion, PLLC

(57) ABSTRACT

Systems and method may provide unmanned aerial vehicle (UAV) connection monitoring and location reporting. A method implemented by at least one processor includes receiving, by an unmanned aerial system application enabler (UAE) server, a location report indicating a location of the UAV from a location management (LM) server; receiving, by the UAE server, a lost connection report indicating a loss of connection with the UAV; receiving, by the UAE server, a connection resumption report from a network resource management (NRM) server indicating that the connection with the UAV has been re-established; and based on receiving the connection resumption report, transmitting, from the UAE server, a location update request to the LM server.

20 Claims, 9 Drawing Sheets

(56) References Cited

U.S. PATENT DOCUMENTS

2020/0043348 A1    2/2020   Ghosh et al.
2020/0394927 A1   12/2020   Neubauer et al.

OTHER PUBLICATIONS

Written Opinion of the International Searching Authority dated Jan. 11, 2022 in Application No. PCT/US 21/53949.
Extended European Search Report dated May 24, 2023 in European Application No. 21920043.3.

UNMANNED AERIAL SYSTEM COMMUNICATION

CROSS-REFERENCE TO RELATED APPLICATION

This application claims priority from U.S. Provisional Application No. 63/136,330, filed on Jan. 12, 2021, the disclosure of which is incorporated herein by reference in its entirety.

FIELD

Embodiments of the present disclosure relate to operation of unmanned aerial systems, and more specifically, to real time UAV network connection monitoring and location reporting.

BACKGROUND

As a result of recent technical developments, unmanned aerial vehicles (UAVs) have become considerably easier to fly, which in turn has made them popular not only with professional UAV pilots and determined and affluent hobbyists but also with the general public. As a result, millions of UAVs are now sold every year compared to a few thousand—if that many—model helicopters some 15 years ago. At the same time, the knowledge, proficiency, and engagement of the user community, on average, have decreased.

SUMMARY

According to embodiments, a method of unmanned aerial vehicle (UAV) connection monitoring and location reporting is implemented by at least one processor and includes receiving, by an unmanned aerial system application enabler (UAE) server, a location report indicating a location of the UAV from a location management (LM) server; receiving, by the UAE server, a lost connection report indicating a loss of connection with the UAV; receiving, by the UAE server, a connection resumption report from a network resource management (NRM) server indicating that the connection with the UAV has been re-established; and based on receiving the connection resumption report, transmitting, from the UAE server, a location update request to the LM server.

According to embodiments, a device for implementing an unmanned aerial system application enabler (UAE) server includes at least one processor; and memory including computer code, the computer code including: first receiving code configured to cause the at least one processor to receive a location report indicating a location of an unmanned aerial vehicle (UAV) from a location management (LM) server; second receiving code configured to cause the at least one processor to receive a lost connection report indicating a loss of connection with the UAV; third receiving code configured to cause the at least one processor to receive a connection resumption report from a network resource management (NRM) server indicating that the connection with the UAV has been re-established; and transmitting code configured to cause the at least one processor to, based on receiving the connection resumption report, transmit a location update request to the LM server.

According to embodiments, a non-transitory computer-readable medium storing computer code that is configured to, when executed by at least one processor included in a device for unmanned aerial vehicle (UAV) connection monitoring and location reporting, cause the at least one processor to: receive, by an unmanned aerial system application enabler (UAE) server, a location report indicating a location of the UAV from a location management (LM) server; receive, by the UAE server, a lost connection report indicating a loss of connection with the UAV; receive, by the UAE server, a connection resumption report from a network resource management (NRM) server indicating that the connection with the UAV has been re-established; and based on receiving the connection resumption report, transmit, from the UAE server, a location update request to the LM server.

BRIEF DESCRIPTION OF THE DRAWINGS

Further features, the nature, and various advantages of the disclosed subject matter will be more apparent from the following detailed description and the accompanying drawings in which.

DETAILED DESCRIPTION

Figure 1:
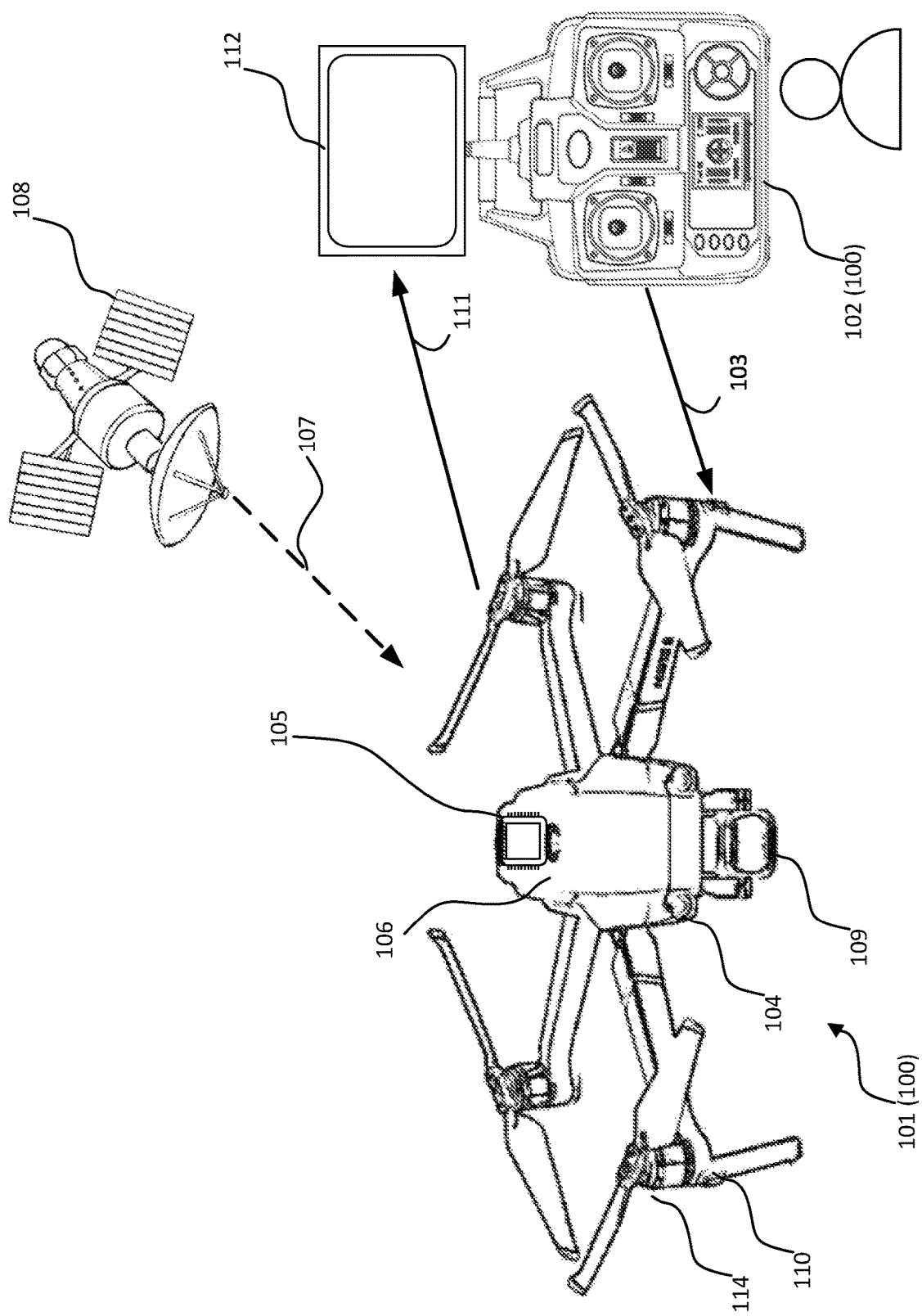
FIG. 1 is a schematic illustration of an unmanned aerial system (UAS).

Referring to FIG. 1, an unmanned aerial system (UAS) (100) can include an unmanned aerial vehicle (UAV) (101) and a controller (102). The controller (102) can use a data link (103) to communicate control commands from the controller (102) to the UAV (101). The controller (102) may include at least one communication circuit that is configured to provide communication, that constitutes the data link (103), via very high frequency (VHF), ultra-high frequency (UHF), or other wireless technology that is analog or digital radio conveying. The controller (102) via the data link (103) may control power levels of the engines (114) of the UAV (101) or control surfaces of the UAV (101). More abstract commands like pitch, yaw, and roll, similar to those of helicopters or aircraft, can also be used. An experienced pilot can operate some UAVs with those basic controls, not relying on any advanced onboard processing of control signals inside a UAV. UAVs have been available in many forms, including as helicopters and aircraft.

Advances in onboard electronic designs more recently allow the offload of certain tasks from the human operator to the UAV itself. Many UAVs, today, include sensor(s) (104) that indicate to an onboard controller (105) of the UAV (101) characteristics of the UAV (101) such as, for example, the attitude and the acceleration of the UAV (101). The onboard controller (105) can be a computer system with a scaleddown or non-existent user interface. The information obtained by the sensor(s) (104), in addition to the control inputs received from the data link (103) from the controller (102), may allow the UAV (101) to remain stable unless positive control input is obtained from the controller (102).

Even more recently, UAVs can include a receiver (106) configured to receive communication from one of the Global Navigation Satellite Systems (GNSS), such as the Global Positioning System (GPS) operated by the United States. FIG. 1 illustrates a single satellite (108) that provides a signal (107) as such communication, to represent a GNSS. However, the receiver (106) of the UAV (101) may receive communication from a GNSS that includes three or more, and typically four or more, line-of-sight satellites to triangulate the position of the UAV (101) in space. The receiver (106), which may be a GNSS receiver, may determine with fair accuracy the position of the UAV (101) in space and time. In some UAVs, a GNSS can be augmented by additional sensors (such as an ultrasonic or LIDAR sensor) of the UAV (101) on the vertical (Z-) axis to enable soft landings (not depicted). The UAV (101), according to some embodiments, may be configured to perform features such as "fly home" and "auto-land" based on GNSS capabilities, where the UAV (101) flies to a location that was defined as its home location. Such features may be performed by the UAV (101) based upon a simple command from the controller (102) (like: the push of a single button) or in case of a loss of the data link (103) from the controller (102) or other timeout of meaningful control input.

As another recent development, the UAV (101) may also include one or more cameras (109). In some cases, the UAV (101) may include a gimbal-mounted camera as one of the cameras (109) and can be used to record pictures and video of a quality sufficient for the UAV's users—today, often in High Definition TV resolution. In some cases, the UAV (101) may include other cameras (110), often covering some or all axes of movement, and the UAV (101) may be configured to perform onboard signal processing based on signals from the cameras (110) for collision avoidance with both fixed and moving objects.

In some cases, the UAV (101) may include a "main" camera as one of the cameras (109) and its camera signal can be communicated by a communication interface (e.g. communication circuit) of the UAV (101) via a data link (111) in real-time towards the human user, and displayed on a display device (112) included in, attached to, or separate from the controller (102). The data link (111) may be the same as or different from the data link (103). Accordingly, UAVs may be successfully flown out of line-of-sight of a human pilot, using a technique known as "First Person View" (FPV).

Figure 2:
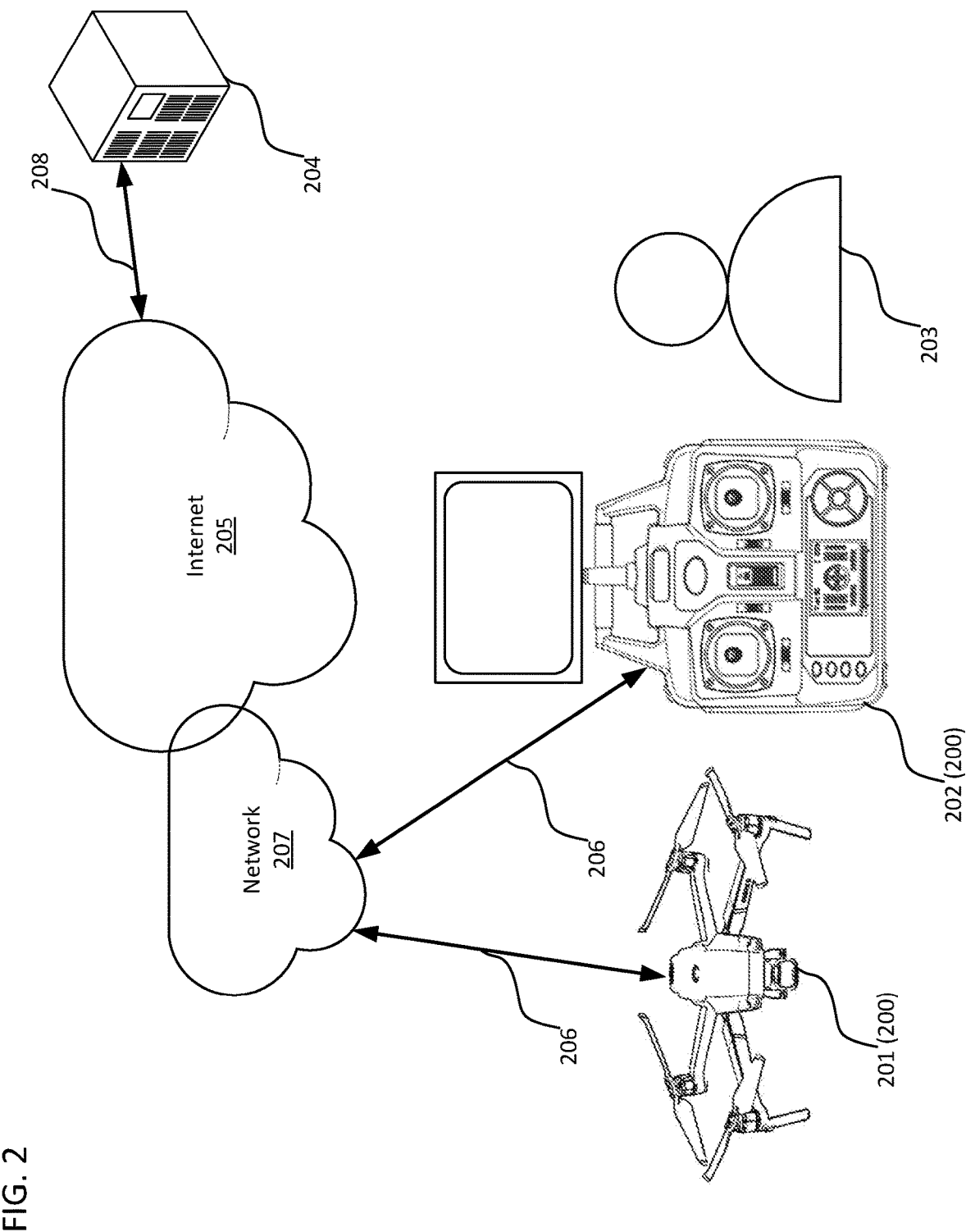
FIG. 2 is a schematic illustration of a UAS that includes UAS communication with at least one server.

Referring to FIG. 2, a UAS (200) may include a UAV (201) and a controller (202). The UAV (201) and the controller (202) may be the same or similar to the UAV (101) and the controller (102) illustrated in FIG. 1, respectively. The UAS may exchange data traffic with a UAS service supplier (USS) (204) or a UAS traffic management (UTM). According to an embodiment, the UAS (200), potentially operated by a human pilot (203), may be configured to inform one or more USSs (204) about the position of the UAV (201) in real-time. The reporting can be conducted using the Internet (205). For all but the most exotic use cases involving tethered UAVs, this may imply that one or both of the UAV (201) and the controller (202) of the UAS (200) may configured to have a connection (206) over a wireless network such as a network (207) (e.g. 5G Network) to the Internet (205), and the USS (204) also may have a connection (208) to the Internet (205). Such a scenario may be assumed herein, but embodiments of the present disclosure are not limited thereto. Networks other than the Internet (205) may also be used. For example, conceivably, a closed wireless network that is not the Internet could be used to communicate between the UAS (200) and the USS (204). Closed wireless networks may be used for certain military UAVs. When referring to the "Internet" henceforth, such networks are meant to be included.

Many physical wireless network technologies may be deployed in uses that enable connections (206) (e.g. wireless connections) and networks (207) (e.g. wireless networks) to connect systems such as the controller (202) or the UAV (201) of the UAS (200) to the Internet (205). For outdoor applications, mobile networks may be used such as, for example, $5^{th}$ Generation or "5G" networks. Henceforth, the use of such a 5G network may be assumed but embodiments of the present disclosure are not limited thereto. Other physical network technologies can equally be employed, including for example, 3G, 3.5G, 4G, LTE mobile networks, wireless LAN in infrastructure or ad hoc mode, zig-bee, and so on. In embodiments of the present disclosure, a mobile network carrying the Internet can offer bi-directional communication, such as, for example, between the UAS (200) and the USS (204). The Quality of Service in each direction may differ however. According to embodiments of the present disclosure, the UAV (201), the controller (202), and/or the USS (204) may include communication interfaces (including for example, a transmitter and/or a receiver) and at least one processor with memory that implements one or more of the physical wireless network technologies, so as to be configured to communicate via one or more of the network types of the present disclosure.

With reference to FIG. 2, the connections (206) between the Internet (205) through a network (207) (e.g. a 5G network) to the UAV (201) and/or the controller (202) can be bi-directional. When using Internet protocols such as Internet Protocol (IP), Transmission Control Protocol (TCP), User Datagram Protocol (UDP), Hypertext Transfer Protocol (HTTP), Quick UDP Internet Connections (QUIC), and similar, for the communication between the UAS (200) and the USS (204), then by the nature of such protocols, a bi-directional link may be required for those protocols to work.

Figure 3:
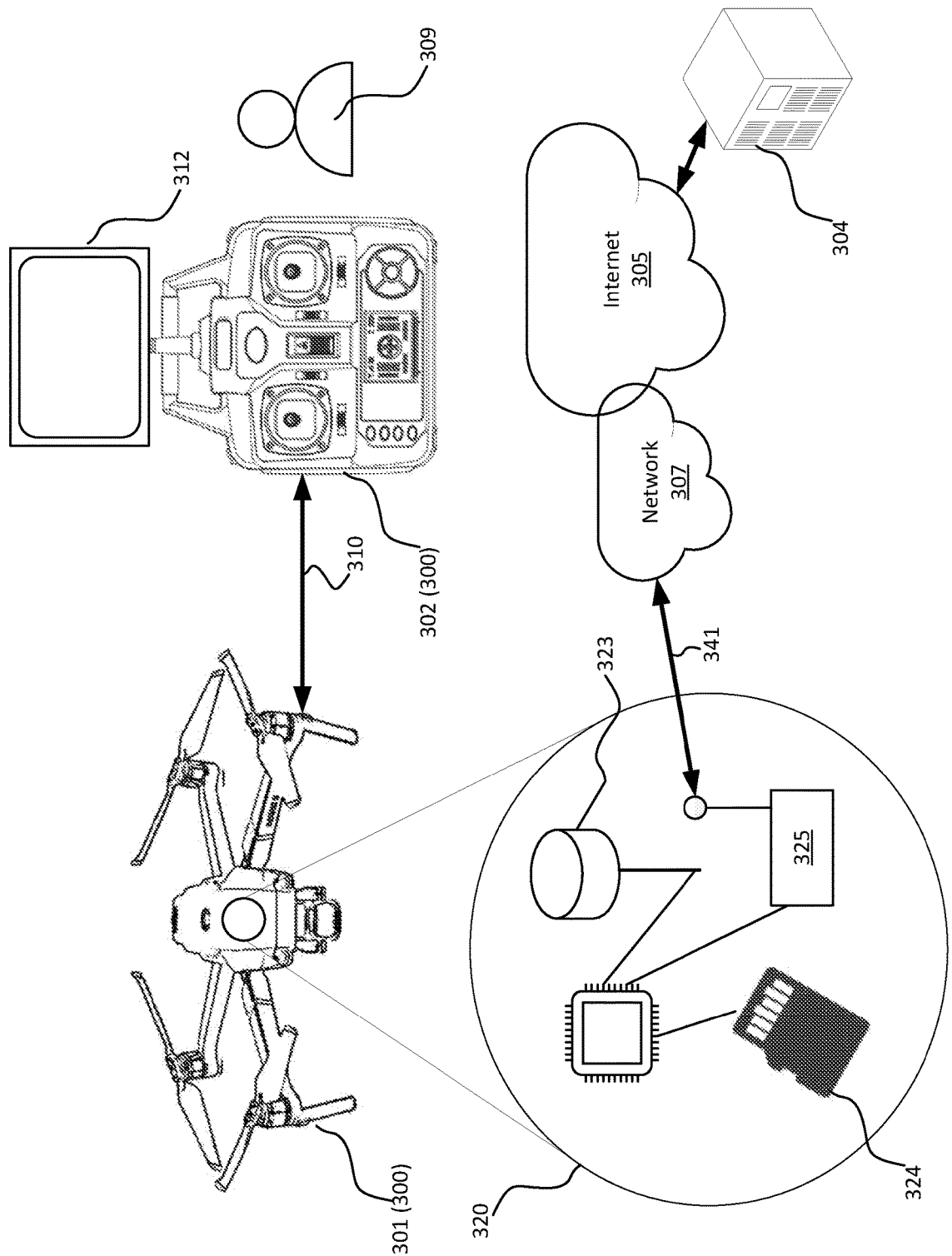
FIG. 3 is a schematic illustration of a system, including a UAS, in accordance with an embodiment.
Figure 4:
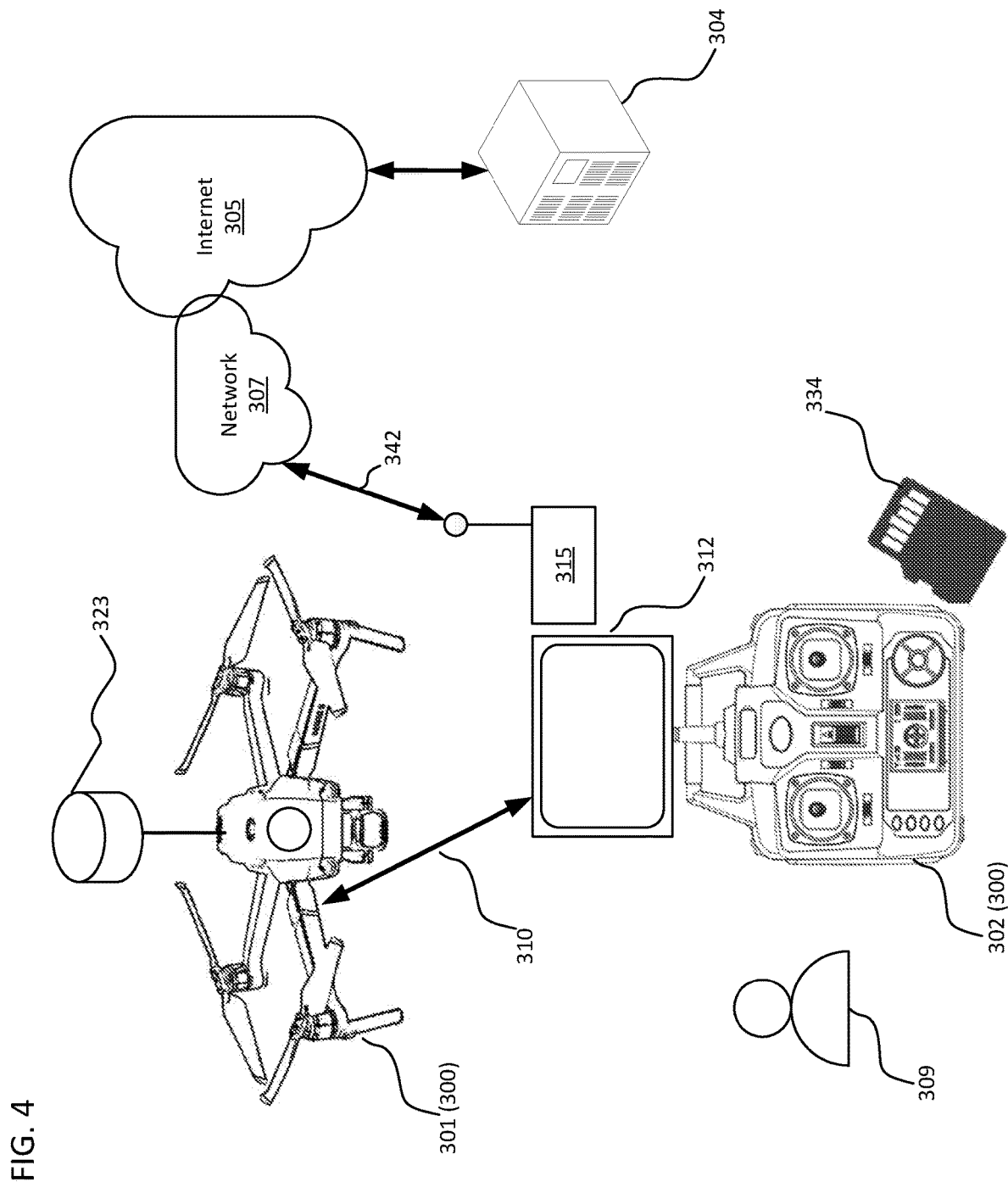
FIG. 4 is a schematic illustration of a system, including a UAS, in accordance with an embodiment.

Referring to FIGS. 3-4, in an embodiment of the present disclosure, a system may be provided. The system may include a UAV (301) and a controller (302), that together constitute a UAS (300). The UAV (301) and the controller (302) may include any number of the hardware (e.g. cameras and communication interfaces) and software components described with respect to the UAS (100) and the UAS (200) illustrated in FIGS. 1-2, and may be configured to perform the functions described with respect to the UAS (100) and the UAS (200). According to embodiments, with reference to FIG. 3, the UAV (301) may include a computer system (320) that includes at least one processor and memory storing computer code, wherein the computer code is configured to cause the UAV (301) to perform its functions when executed by the at least one processor of the UAV (301). The computer system (320) may be implemented by any number of the components of computer system (900) described later below with reference to FIG. 9, and may exclude most user interface components illustrated in FIG. 9. The computer system (320) may be an embedded system and may advantageously (for space and weight reasons) be part of, or integrated into, the onboard flight control circuitry of the UAV (301). The computer system (320) may have a mechanism to obtain its location in three-dimensional space.

For example, the computer system (320) may include a GPS antenna (323) that, together with a GPS receiver, may be one example of such mechanisms. The computer system (320) may include other mechanisms such as, for example, a combination of GPS with (potentially more accurate) barometric altitude sensors, a triangulation mechanism to determine a lateral position from ground-based navigation tools (omnidirectional range navigation systems (VORs), cell phone towers, etc.), and so forth. The UAV (301) may also include memory storage (324) accessible by the user (309) of the UAV (301). For example, as illustrated in FIG. 3, the memory storage (324) may be a micro-SD card. However, the memory storage (324) could also be another changeable semiconductor storage, onboard NV-RAM in the UAV (301) that is accessible through a network plug from a computer or wireless LAN, and so forth.

The controller (302) may also include a computer system that includes at least one processor and memory storing computer code, wherein the computer code is configured to cause the controller (302) to perform its functions when executed by the at least one processor of the controller (302). The computer system of the controller (302) may be implemented by any number of the components of computer system (900) described later below with reference to FIG. 9. With reference to FIG. 4, the controller (302) may include a memory storage (334) accessible by the user (309) of the controller (302). The memory storage (334) may have a same or similar configuration as the memory storage (324). According to embodiments, one, none, or both of the memory storage (324) and the memory storage (334) may be included in the UAS (300). The memory storage (324) and/or the memory storage (334) may have at least a sufficient size to store information pertaining to the airspace(s) the UAV may operate in.

Details of protocols used for the communication between the UAS (300) (e.g. the UAV (301) or the controller (302)) and the one or more servers (304) (e.g. the USS) may depend on the services offered by the one or more servers (304).

More recently, airspace authorities including the FAA have implemented modern query interfaces that allow automated download of information pertinent to a specific location with a granularity much finer than a state. These interfaces can be based on RESTful operations. Representational State Transfer (REST), is a technique in which a client can query a server identified by a base Unified Resource Indicator (URI) through standard HTTP methods (including, for example, GET, POST, PUT, PATCH, or DELETE) in a defined format. One such defined standardized format is known as Java Object Notation (JSON).

With reference to FIG. 3, the computer system (320) of the UAV (301) may include a communication interface that includes, for example, one or more communicators such as a communicator (325), which may include, for example, a 5G antenna. The communicator (325) may be configured to send data to and receive data (e.g. the information pertaining to the airspace(s)) from the Internet (305) by using the network (307). The communicator (325), or another communicator of the communication interface of the UAV (301), may be configured to send data (e.g. sensor data, video data, the information pertaining to the airspace(s)) to and receive data (e.g. command data) from the controller (302) via a wireless connection (310). The controller (302) may also have a communication interface with a communicator that is configured to send data (e.g. commands) to and receive data (e.g. sensor data, video data, the information pertaining to the airspace(s)) from the UAV (301) via the wireless connection (310). With reference to FIG. 4, a communicator (315) of the controller (302), or another communicator of the communication interface of the controller (302), may be configured to send data to and receive data (e.g. the information pertaining to the airspace(s)) from the Internet (305) by using the network (307). Each communicator of the present disclosure may include, for example, a transmitter and a receiver.

In the 3rd Generation Partnership Project (3GPP) 5G wireless architecture, there may be a service enabler architecture layer for verticals (SEAL) which provides procedures, information flows, and APIs to support vertical applications over a 3GPP system. To ensure efficient use and deployment of vertical applications over 3GPP systems, SEAL services may include, but is not limited to, group management, configuration management, location management, identity management, key management, and network resource management.

Figure 5:
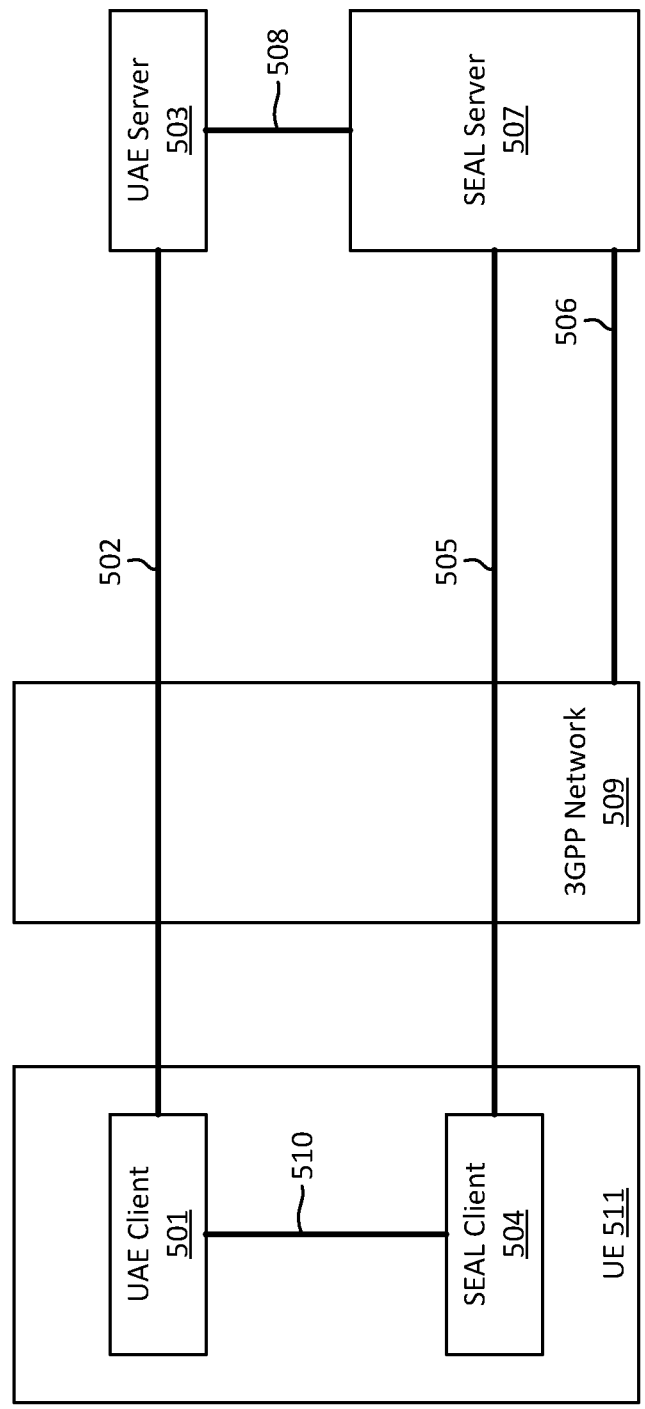
FIG. 5 is a schematic illustration of an example SEAL general architecture for a UAS.

With reference to FIG. 5, an example SEAL general architecture for a UAS is described below.

The SEAL general architecture may include, for example, user equipment (UE) (511) (e.g. a UAS), a 3GPP network (509), a UAS Application Enabler (UAE) server (402), and a SEAL server(s) (507). The UE(s) (511) may include, for example, a UAE client(s) (501) and a SEAL client(s) (504). In embodiments, the UAE client (501) and SEAL client (506) may be outside of, or not included in, UE (511).

A UAS application enabler (UAE) layer offers the UAE capabilities to the UAS application-specific layer. A UAE layer may include a UAE client (501) and a UAE server (503). The UAE client and UAE server communicate with each other through the 3GPP network use a reference point (502). The UAE client (501) may provide the UAE-client side functionalities, and may support interactions with SEAL client(s) (504) over a reference point (510). The UAE server (503) may provide the UAE-server side functionalities, and may support interactions with the SEAL server(s) (507) over a reference point (508).

The SEAL client(s) (504) may provide the client side functionalities corresponding to the specific SEAL service, and the SEAL client(s) (504) may support interactions with the UAE client(s) (501), and may also support interactions with the corresponding SEAL client (504) between two UEs (511). The SEAL server(s) (507) may provide the server side functionalities corresponding to the specific SEAL service, may support the interactions with the UAE server(s) (503), and may also support interactions with the corresponding SEAL server (507) in distributed SEAL deployments.

The SEAL client(s) (504) may communicate with the SEAL server(s) (507) through the 3GPP network over the reference point (505). Reference point (505) may support both unicast and multicast delivery modes. The SEAL client(s) (501) may provide service enabler layer support functions to the UAE client(s) (501) over reference points (510). The UAE server(s) (503) may communicate with the SEAL server(s) (507) over the reference point (508). The SEAL server(s) (507) may communicate with the underlying 3GPP core network systems using the respective 3GPP interfaces (506) specified by the 3GPP network system.

Interactions related to vertical application layer support functions between the UAE client (501) and a vertical application layer (VAL) server may be provided over a reference point (502). The VAL server may be a part of, or provided with, the UAE server (503). The interactions between a SEAL client (504) and the corresponding SEAL server (507) may be provided over a reference point (505). The reference point (505) may be a specific SEAL service (such as network resource management) reference point, which may be specified in the specific SEAL service functional model.

A network resource management (NRM) server may be provided that communicates with a 3GPP Policy and Charging Rules Function (PCRF) over a reference point (506). The NRM server (NRM-S) may communicate with a 3GPP 5G Policy Control Function (PCF) via a reference point (506) to control unicast resources from the underlying 3GPP network (509). The NRM server may be a part of, provided with, implemented by, or included in the SEAL server (507), and the PCRF and the PCF may be included in the 3GPP network (509). In embodiments, a location management server (LMS) may be a part of, provided with, implemented by, or included in the SEAL server (507).

The SEAL clients 504 may include multiple features, for example network resource management (NRM). An NRM client (NRM-C) may be deployed in the UE 511 side, for example a part of, provided with, implemented by, or included in SEAL client 50, to communicate with NRM server for network resource or condition detection and reporting. A location management client (LMC) may be deployed in the UE 511 side, for example a part of, provided with, implemented by, or included in SEAL client 504, to communicate with an LMS for UE location report and monitoring.

The communication between SEAL client 504 and SEAL server 507, for example between an NRM-C and an NRM-S, or between an LMC and an LMS, may occur between UAE server 503 and SEAL servers 507. For example, if the UAE server 503 would like to know the current network connection status, UAE server 503 may send an inquiry to an NRM server included in SEAL server 507, and in turn the NRM server may communicate with an NRM client included in SEAL client 504 for a report.

In embodiments, a network-connected UAV, for example UAV 101, UAV 201, or UAV 301 discussed above, may lose network communication in any phase of UAV operation. When communication is lost, neither USS/UTM nor 3GPP network can pinpoint the location of the UAV. Therefore, it is important to be able to know the network condition in near real-time to avoid any service delays.

Accordingly, embodiments may relate to a real-time UAV connection monitoring and location reporting mechanism, which may not only enable the UAE server to actively monitor the UAV network connection but also provide other advantages such as accurate location reporting and network converge monitoring.

As mentioned above, the UAV may lose communication with its connected network such as 3GPP 5G, in any phase of UAV operation. When communication is lost, neither USS/UTM nor 3GPP network can pinpoint the location of the UAV. Therefore, it is important to be able to know the network condition in near real-time to avoid any service delays.

Figure 6:
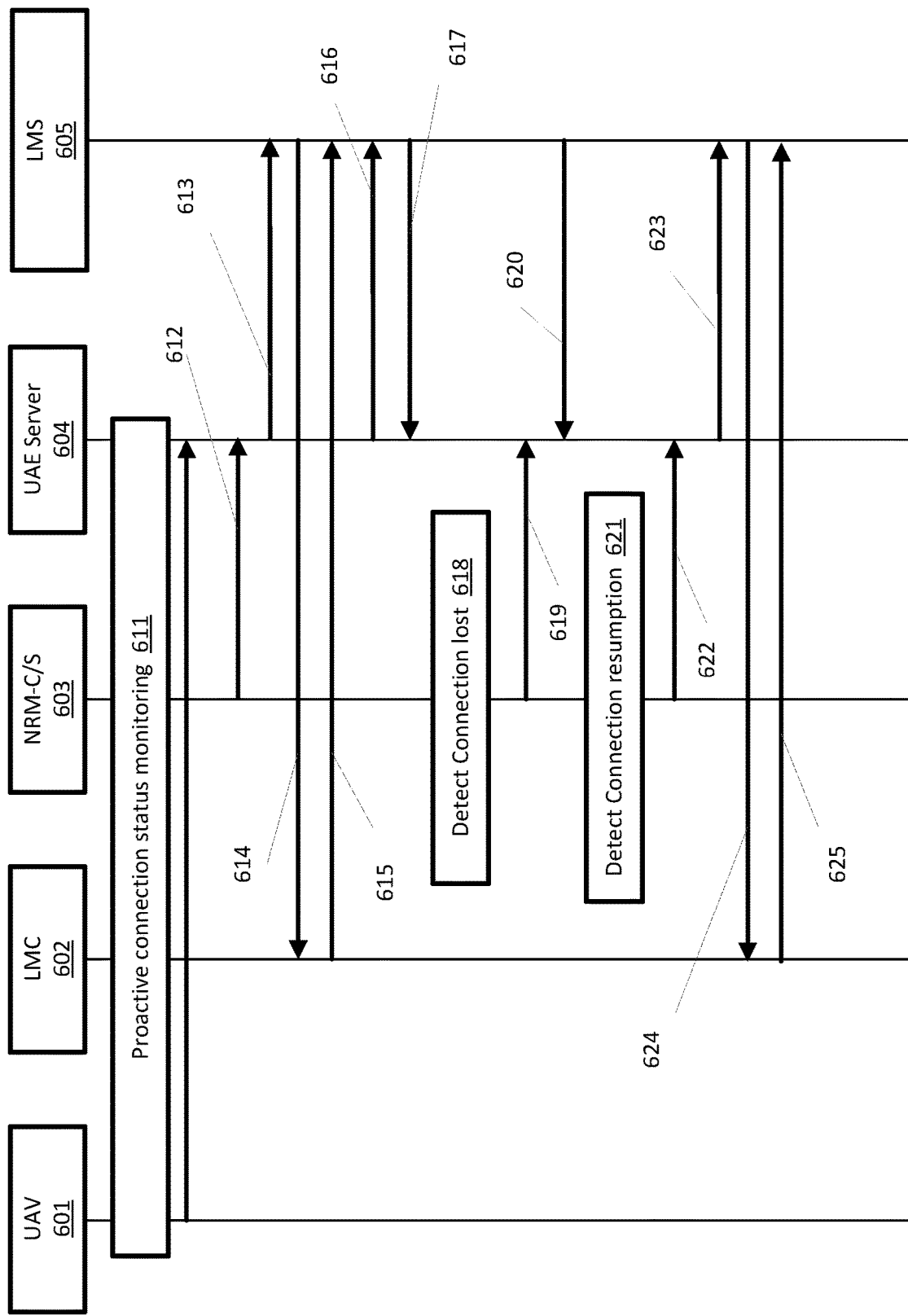
FIG. 6 is schematic illustration of a high-level workflow of unmanned aerial vehicle (UAV) connection monitoring and location reporting, in accordance with an embodiment.

Embodiments may provide a Real-time UAV Connection Monitoring and Location Reporting workflow 600 using existing SEAL functions, which may provide the extra following functionalities:
Real-time monitoring of the 3GPP network connection with UAVs
Reporting when loss of communication with UAV occurs
Providing last known location after loss of communication
Reporting 3GPP Network coverage along UAV's flight path Referring to FIG. 6, workflow 600 may involve UAV 601, LMC 602, NRM-C/S 603, UAE server 604 and LMS 605. In embodiments, UAV 601 may correspond to one or more of UAV 101, UAV 201, or UAV 301 discussed above. In embodiments, UAE server 604 may correspond to UAE 503 discussed above. In embodiments, NRM-C/S 603 may include one or more of NRM-C and NRM-S discussed above. In embodiments, LMC 602 may correspond to LMC discussed above, and LMS 605 may correspond to LMS discussed above. In embodiments, one or more of NRM-C, NRM-S, NRM-C/S 603, LMC 602, and LMS 605 may be a part of, provided with, implemented by, or included in one or more of the SEAL client 504 and the SEAL server (507)

In embodiments, a UAV 601 may establish a connection with the 3GPP network and the SEAL network resource management and location services are deployed for connected UAVs.

The UAE server 604 may provide proactive network connection monitoring (step 611) by periodically pulling (step 612) the 3GPP network signal reception quality report from NRM-C/S 603. In a simple request process, the NRM-S may send a network request to NRM-C and a report sent back by NRM-C may include either a "unicast" or "multicast" network status, which may be used to indicate the network signal quality.

The frequency of actively pulling may be implementation independent. For example, high frequency may mean high power consumption, but provide near real-time monitoring.

When connection status in is in UP status, the UAE server (604) may trigger (step 613) location update request to LMS (605). The LMS (605) may check whether location management client (602) or UAE server (604) is authorized to send a location reporting trigger. Depending on the information specified by the location reporting trigger, LMS (605) initiates an on-demand location reporting procedure or an event-triggered location reporting procedure for the location of LMC (602). In embodiments, a location request is sent from the LMS (605) to the LMC (602) (step 614), and a location response is sent from the LMC (602) to the LMS (605) (step 615).

The UAE server (604) may send out a location inquiry per service request. The UAE server (604) sends a location information request to the LMS (605) (step 616). The LMS (605) may acquire the latest location of the UAV being requested, by triggering an on-demand location report procedure as described above. Then, LMS may immediately send the location information report including the latest location information acquired of the UAV (601) (step 617).

If NRM-S may detect there is a loss of communication-based on the reception quality report from NRM-C (step 618). The NRM-S may indicate to the UAE server (604) that the UAV 601 is unusable, for example by reporting a lost connection (step 619).

With the loss of the communication link, the LMS 605) may still provide the last known location to the UAE server (604) (step 620). Step 620 may the same workflow mentioned above for location inquiry.

If the NRM-S detects communication resumption (step 621), the NRM-S indicates to the UAE server (604) that UAV 601 has become usable, for example by reporting connection resumption (step 622).

Once the UAE server 604 receives notification about connection resumption, it may again trigger the location update request to LMS (605) (step 623). This location request and update process (steps 623-625) may be similar to steps 613-615 discussed above.

Accordingly, embodiments may relate to a method of providing a real-time UAV connection monitoring and location reporting mechanism, enabling the UAE server to actively monitor the UAV network connection, providing other advantages such as accurate location reporting and network converge monitoring.

Figure 7:
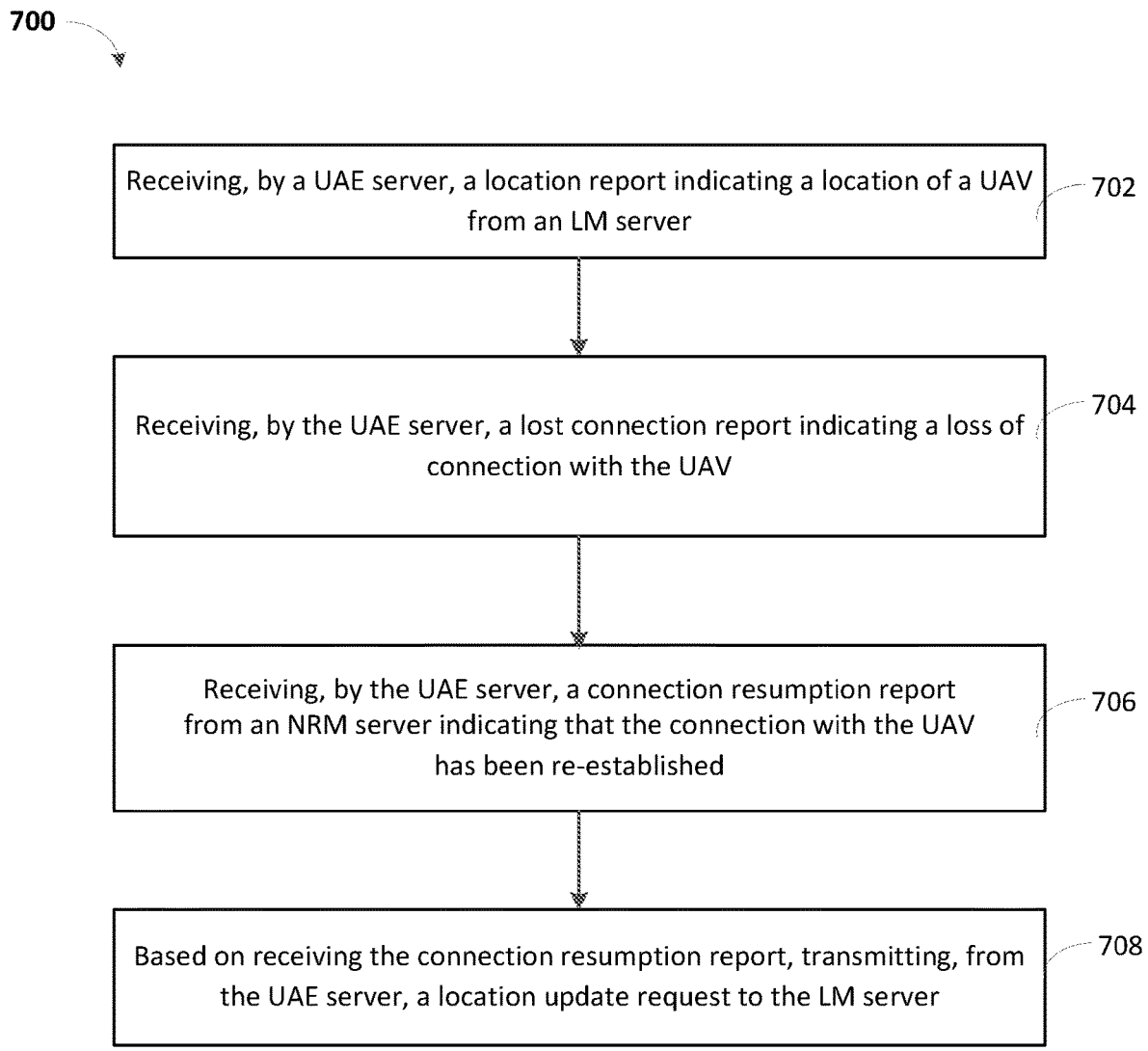
FIG. 7 is schematic illustration of a high-level workflow of unmanned aerial vehicle (UAV) connection monitoring and location reporting, in accordance with an embodiment.

FIG. 7 is a flowchart illustrating an example processes 700 for unmanned aerial vehicle (UAV) connection monitoring and location reporting. FIG. 7 may be described with the aid of FIGS. 1-6. In embodiments, one or more blocks of process 700 may be combined in any order.

As shown in FIG. 7, process 700 may include receiving, by an unmanned aerial system application enabler (UAE) server, a location report indicating a location of the UAV from a location management (LM) server (block 702). In embodiments, the UAE server may correspond to one or more of UAE server 503 and UAE server 604 discussed above. In embodiments, the UAV may correspond to one or more of UAV 101, UAV 201, UAV 301, or UAV 601 discussed above. In embodiments, the LM server may correspond to LMS 605 discussed above.

As further shown in FIG. 7, process 700 may include receiving, by the UAE server, a lost connection report indicating a loss of connection with the UAV (block 704).

As further shown in FIG. 7, process 700 may include receiving, by the UAE server, a connection resumption report from a network resource management (NRM) server indicating that the connection with the UAV has been re-established (block 704). In embodiments, the NRM server may correspond to one or more of an NRM-S or NRM-C/S 603 discussed above.

As further shown in FIG. 7, process 700 may include based on receiving the connection resumption report, transmitting, from the UAE server, a location update request to the LM server (block 704).

In embodiments, the location update request may cause the LM server to transmit a location request to an LM client corresponding to the UAV. In embodiments, the LM client may correspond to LMC 602 discussed above.

In embodiments, the lost connection report may be received from the NRM server.

In embodiments, the NRM server may transmit the lost connection report based on a reception quality report received by the NRM server from an NRM client associated with the UAV. In embodiments, the NRM client may correspond to one or more of an NRM-C or NRM-C/S 603 discussed above.

In embodiments, the location report may be received based on a location request transmitted from the UAE server to the LM server.

In embodiments, the location request may be transmitted from the UAE server based on a network connection state report received by the UAE server from the NRM server.

In embodiments, after receiving the lost connection report, the UAE server may further receive information indicating a last known location of the UAV from the LM server.

It may be appreciated that FIG. 7 provides only illustrations of implementations, and do not imply any limitations with regard to how different embodiments may be implemented. Many modifications to the depicted environments may be made based on design and implementation requirements.

Systems of the present disclosure may include at least one processor and memory storing computer code. The computer code, when executed by the at least one processor, may be configured to cause the at least one processor to perform the functions of the embodiments of the present disclosure. For example, the UAVs and the UAV controllers of the present disclosure may each include a respective at least one processor and memory storing computer code configured to cause the UAVs and the UAV controllers to perform their respective functions. Furthermore, the servers (e.g. UAE server (604), LMS (605), NRM-S, etc) of the present disclosure may be implemented by a same or different at least one processor and/or same or different memory storing computer code.

Figure 8:
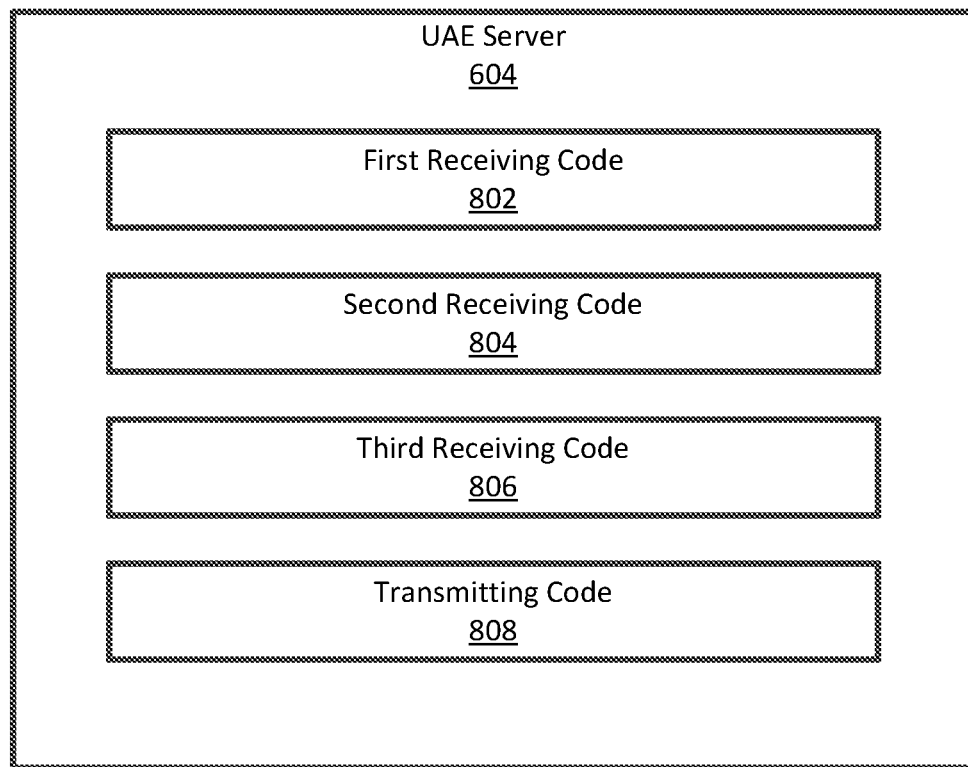
FIG. 8 is a schematic illustration of computer code of a UAE server in accordance with an embodiment.

An example of computer code that implements the UAE server (604) is described below with reference to FIG. 8. The computer code may include, for example, first receiving code (802), second receiving code (804), third receiving code (806), and determining code (808).

The first receiving code (802) may be configured to cause the UAE server (604) to receive a location report indicating a location of an unmanned aerial vehicle (UAV) from a location management (LM) server. In embodiments, the UAV may correspond to one or more of UAV 101, UAV 201, UAV 301, or UAV 601 discussed above. In embodiments, the LM server may correspond to LMS 605 discussed above. In embodiments, the LM server may correspond to LMS 605 discussed above.

The second receiving code (804) may be configured to cause the UAE server (604) to receive a lost connection report indicating a loss of connection with the UAV.

The third receiving code (806) may be configured to cause the UAE server (604) to receive a connection resumption report from a network resource management (NRM) server indicating that the connection with the UAV has been re-established. In embodiments, the NRM server may correspond to one or more of an NRM-S or NRM-C/S 603 discussed above.

The transmitting code (808) may be configured to cause the UAE server (604) to, based on receiving the connection resumption report, transmit a location update request to the LM server.

While example code that is performed by the UAE server (604) is described above, it should be understood by a person of ordinary skill in the art that each of the UAVs, UAVs, the UAV controllers, and the servers of the present disclosure may include and/or be implemented by computer code that is configured to cause the UAVs, UAV controllers, and the servers to perform their respective functions, including the functions described in the present disclosure.

The techniques for Unmanned Aerial System Communication, described above, can be implemented in both controller and UAV as computer software using computer-readable instructions and physically stored in one or more computer-readable media. For example, FIG. 9 shows a computer system (900) suitable for implementing certain embodiments of the disclosed subject matter is illustrated.

The computer software can be coded using any suitable machine code or computer language, that may be subject to assembly, compilation, linking, or like mechanisms to create code including instructions that can be executed directly, or through interpretation, micro-code execution, and the like, by computer central processing units (CPUs), Graphics Processing Units (GPUs), and the like.

The instructions can be executed on various types of computers or components thereof, including, for example, personal computers, tablet computers, servers, smartphones, gaming devices, internet of things devices, and the like.

Figure 9:
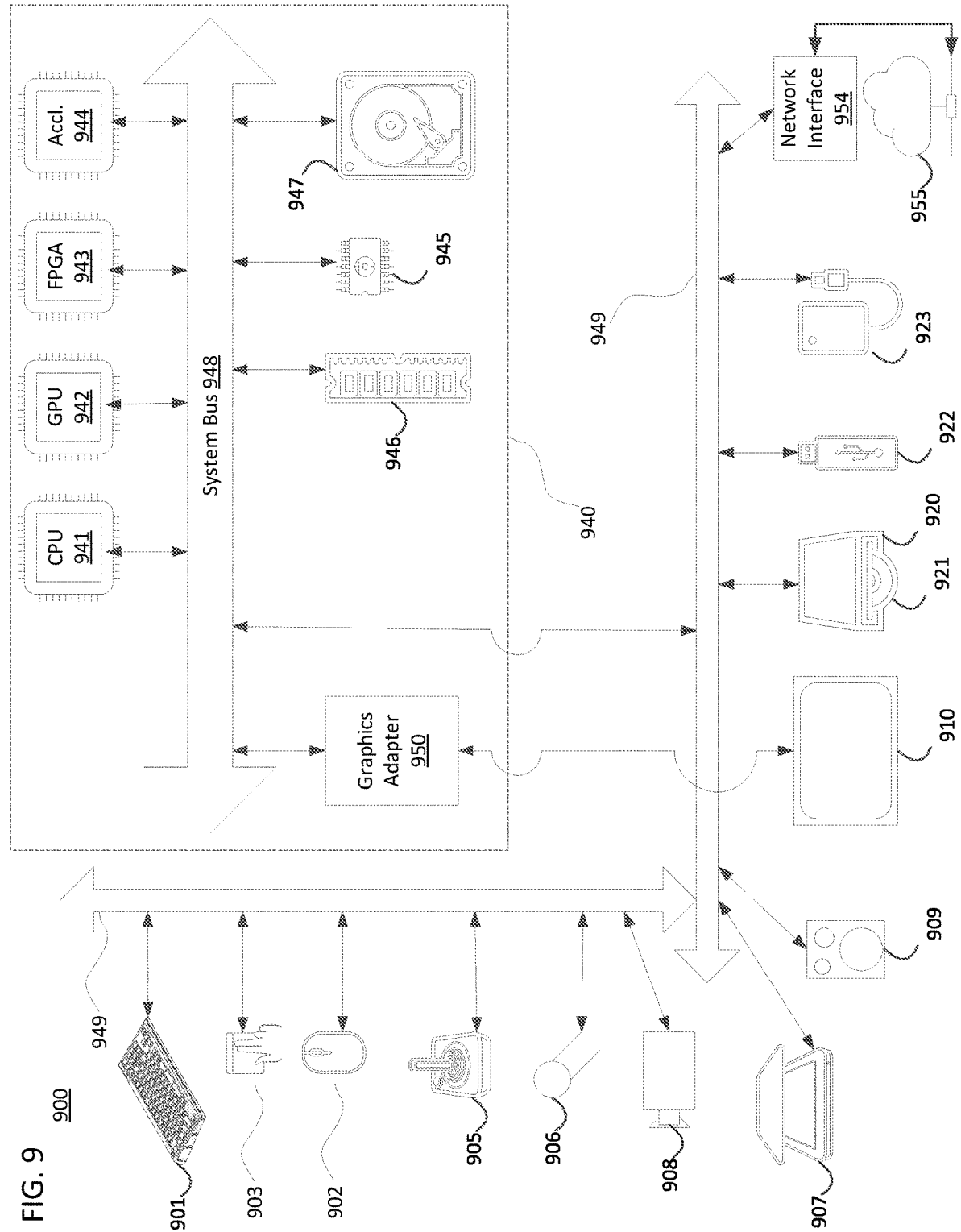
FIG. 9 is a schematic illustration of a computer system in accordance with an embodiment.

The components shown in FIG. 9 for computer system (900) are exemplary in nature and are not intended to suggest any limitation as to the scope of use or functionality of the computer software implementing embodiments of the present disclosure. Neither should the configuration of components be interpreted as having any dependency or requirement relating to any one or combination of components illustrated in the exemplary embodiment of a computer system (900).

Computer system (900) may include certain human interface input devices. Such a human interface input device may be responsive to input by one or more human users through, for example, tactile input (such as: keystrokes, swipes, data glove movements), audio input (such as: voice, clapping), visual input (such as: gestures), olfactory input (not depicted). The human interface devices can also be used to capture certain media not necessarily directly related to conscious input by a human, such as audio (such as: speech, music, ambient sound), images (such as: scanned images, photographic images obtain from a still image camera), video (such as two-dimensional video, three-dimensional video including stereoscopic video).

Input human interface devices may include one or more of (only one of each depicted): keyboard (901), mouse (902), trackpad (903), touch-screen (910), joystick (905), microphone (906), scanner (907), and camera (908).

Computer system (900) may also include certain human interface output devices. Such human interface output devices may be stimulating the senses of one or more human users through, for example, tactile output, sound, light, and smell/taste. Such human interface output devices may include tactile output devices (for example tactile feedback by the touch-screen (910), data-glove, or joystick (905), but there can also be tactile feedback devices that do not serve as input devices. For example, such devices may be audio output devices (such as: speakers (909), headphones (not depicted)), visual output devices (such as screens 910 to include CRT screens, LCD screens, plasma screens, OLED screens, each with or without touch-screen input capability, each with or without tactile feedback capability—some of which may be capable to output two dimensional visual output or more than three dimensional output through means such as stereographic output; virtual-reality glasses (not depicted), holographic displays and smoke tanks (not depicted)), and printers (not depicted).

Computer system (900) can also include human accessible storage devices and their associated media such as optical media including CD/DVD ROM/RW (920) with CD/DVD or the like media (921), thumb-drive (922), removable hard drive or solid state drive (923), legacy magnetic media such as tape and floppy disc (not depicted), specialized ROM/ASIC/PLD based devices such as security dongles (not depicted), and the like.

Those skilled in the art should also understand that term "computer readable media" as used in connection with the presently disclosed subject matter does not encompass transmission media, carrier waves, or other transitory signals.

Computer system (900) can also include interface to one or more communication networks. Networks can for example be wireless, wireline, optical. Networks can further be local, wide-area, metropolitan, vehicular and industrial, real-time, delay-tolerant, and so on. Examples of networks include local area networks such as Ethernet, wireless LANs, cellular networks to include GSM, 3G, 4G, 5G, LTE and the like, TV wireline or wireless wide area digital networks to include cable TV, satellite TV, and terrestrial broadcast TV, vehicular and industrial to include CANBus, and so forth. Certain networks commonly require external network interface adapters that attached to certain general purpose data ports or peripheral buses (949) (such as, for example USB ports of the computer system (900); others are commonly integrated into the core of the computer system (900) by attachment to a system bus as described below (for example Ethernet interface into a PC computer system or cellular network interface into a smartphone computer system). Using any of these networks, computer system (900) can communicate with other entities. Such communication can be uni-directional, receive only (for example, broadcast TV), uni-directional send-only (for example CANbus to certain CANbus devices), or bi-directional, for example to other computer systems using local or wide area digital networks. Such communication can include communication to a cloud computing environment (955). Certain protocols and protocol stacks can be used on each of those networks and network interfaces as described above.

Aforementioned human interface devices, human-accessible storage devices, and network interfaces (954) can be attached to a core (940) of the computer system (900).

The core (940) can include one or more Central Processing Units (CPU) (941), Graphics Processing Units (GPU) (942), specialized programmable processing units in the form of Field Programmable Gate Areas (FPGA) (943), hardware accelerators (944) for certain tasks, and so forth. These devices, along with Read-only memory (ROM) (945), Random-access memory (RAM) (946), internal mass storage such as internal non-user accessible hard drives, SSDs, and the like, may be connected through a system bus (948). In some computer systems, the system bus (948) can be accessible in the form of one or more physical plugs to enable extensions by additional CPUs, GPU, and the like. The peripheral devices can be attached either directly to the core's system bus (948), or through a peripheral bus (949). Architectures for a peripheral bus include PCI, USB, and the like. A graphics adapter (950) may be included in the core (940).

CPUs (941), GPUs (942), FPGAs (943), and accelerators (944) can execute certain instructions that, in combination, can make up the aforementioned computer code. That computer code can be stored in ROM (945) or RAM (946). Transitional data can be also be stored in RAM (946), whereas permanent data can be stored for example, in the mass storage (947) that is internal. Fast storage and retrieve to any of the memory devices can be enabled through the use of cache memory, that can be closely associated with one or more CPU (941), GPU (942), mass storage (947), ROM (945), RAM (946), and the like.

The computer readable media can have computer code thereon for performing various computer-implemented operations. The media and computer code can be those specially designed and constructed for the purposes of the present disclosure, or they can be of the kind well known and available to those having skill in the computer software arts.

As an example and not by way of limitation, the computer system (900) having architecture, and specifically the core (940) can provide functionality as a result of processor(s) (including CPUs, GPUs, FPGA, accelerators, and the like) executing software embodied in one or more tangible, computer-readable media. Such computer-readable media can be media associated with user-accessible mass storage as introduced above, as well as certain storage of the core (940) that are of non-transitory nature, such as core-internal mass storage (947) or ROM (945). The software implementing various embodiments of the present disclosure can be stored in such devices and executed by core (940). A computer-readable medium can include one or more memory devices or chips, according to particular needs. The software can cause the core (940) and specifically the processors therein (including CPU, GPU, FPGA, and the like) to execute particular processes or particular parts of particular processes described herein, including defining data structures stored in RAM (946) and modifying such data structures according to the processes defined by the software. In addition or as an alternative, the computer system can provide functionality as a result of logic hardwired or otherwise embodied in a circuit (for example: accelerator (944)), which can operate in place of or together with software to execute particular processes or particular parts of particular processes described herein. Reference to software can encompass logic, and vice versa, where appropriate. Reference to a computer-readable media can encompass a circuit (such as an integrated circuit (IC)) storing software for execution, a circuit embodying logic for execution, or both, where appropriate. The present disclosure encompasses any suitable combination of hardware and software.

While this disclosure has described several non-limiting example embodiments, there are alterations, permutations, and various substitute equivalents, which fall within the scope of the disclosure. It will thus be appreciated that those skilled in the art will be able to devise numerous systems and methods which, although not explicitly shown or described herein, embody the principles of the disclosure and are thus within the spirit and scope thereof.

What is claimed is:

1. A method of unmanned aerial vehicle (UAV) connection monitoring and location reporting, the method being implemented by at least one processor and comprising:
   receiving, by an unmanned aerial system application enabler (UAE) server, a location report indicating a location of the UAV from a location management (LM) server;
   receiving, by the UAE server, a lost connection report indicating a loss of connection with the UAV;
   receiving, by the UAE server, a connection resumption report from a network resource management (NRM) server indicating that the connection with the UAV has been re-established; and
   based on receiving the connection resumption report, transmitting, from the UAE server, a location update request to the LM server.

2. The method of claim 1, wherein the location update request causes the LM server to transmit a location request to an LM client corresponding to the UAV.

3. The method of claim 1, wherein the lost connection report is received from the NRM server.

4. The method of claim 3, wherein the NRM server transmits the lost connection report based on a reception quality report received by the NRM server from an NRM client associated with the UAV.

5. The method of claim 1, wherein the location report is received based on a location request transmitted from the UAE server to the LM server.

6. The method of claim 5, wherein the location request is transmitted from the UAE server based on a network connection state report received by the UAE server from the NRM server.

7. The method of claim 1, wherein, after receiving the lost connection report, the UAE server further receives information indicating a last known location of the UAV from the LM server.

8. A device for implementing an unmanned aerial system application enabler (UAE) server, the device comprising:
   at least one processor; and
   memory comprising computer code, the computer code comprising:
     first receiving code configured to cause the at least one processor to receive a location report indicating a location of an unmanned aerial vehicle (UAV) from a location management (LM) server;
     second receiving code configured to cause the at least one processor to receive a lost connection report indicating a loss of connection with the UAV;
     third receiving code configured to cause the at least one processor to receive a connection resumption report from a network resource management (NRM) server indicating that the connection with the UAV has been re-established; and
     transmitting code configured to cause the at least one processor to, based on receiving the connection resumption report, transmit a location update request to the LM server.

9. The device of claim 8, wherein the location update request causes the LM server to transmit a location request to an LM client corresponding to the UAV.

10. The device of claim 8, wherein the lost connection report is received from the NRM server.

11. The device of claim 10, wherein the NRM server transmits the lost connection report based on a reception quality report received by the NRM server from an NRM client associated with the UAV.

12. The device of claim 8, wherein the location report is received based on a location request transmitted from the UAE server to the LM server.

13. The device of claim 12, wherein the location request is transmitted from the UAE server based on a network connection state report received by the UAE server from the NRM server.

14. The device of claim 8, wherein, after receiving the lost connection report, the UAE server further receives information indicating a last known location of the UAV from the LM server.

15. A non-transitory computer-readable medium storing computer code that is configured to, when executed by at least one processor included in a device for unmanned aerial vehicle (UAV) connection monitoring and location reporting, cause the at least one processor to:
   receive, by an unmanned aerial system application enabler (UAE) server, a location report indicating a location of the UAV from a location management (LM) server;
   receive, by the UAE server, a lost connection report indicating a loss of connection with the UAV;
   receive, by the UAE server, a connection resumption report from a network resource management (NRM) server indicating that the connection with the UAV has been re-established; and
   based on receiving the connection resumption report, transmit, from the UAE server, a location update request to the LM server.

16. The non-transitory computer-readable medium of claim 15, wherein the location update request causes the LM server to transmit a location request to an LM client corresponding to the UAV.

17. The non-transitory computer-readable medium of claim 15, wherein the lost connection report is received from the NRM server.

18. The non-transitory computer-readable medium of claim 17, wherein the NRM server transmits the lost connection report based on a reception quality report received by the NRM server from an NRM client associated with the UAV.

19. The non-transitory computer-readable medium of claim 15, wherein the location report is received based on a location request transmitted from the UAE server to the LM server.

20. The non-transitory computer-readable medium of claim 15, wherein, after receiving the lost connection report, the UAE server further receives information indicating a last known location of the UAV from the LM server.

* * * * *